US009075081B2

(12) United States Patent
Hagmann

(10) Patent No.: US 9,075,081 B2
(45) Date of Patent: Jul. 7, 2015

(54) METHOD AND MEANS FOR COUPLING HIGH-FREQUENCY ENERGY TO AND/OR FROM THE NANOSCALE JUNCTION OF AN ELECTRICALLY-CONDUCTIVE TIP WITH A SEMICONDUCTOR

(71) Applicant: Mark J. Hagmann, Salt Lake City, UT (US)

(72) Inventor: Mark J. Hagmann, Salt Lake City, UT (US)

( * ) Notice: Subject to any disclaimer, the term of this patent is extended or adjusted under 35 U.S.C. 154(b) by 0 days.

(21) Appl. No.: 14/223,727

(22) Filed: Mar. 24, 2014

(65) Prior Publication Data
US 2015/0067931 A1 Mar. 5, 2015

Related U.S. Application Data

(60) Provisional application No. 61/806,691, filed on Mar. 29, 2013.

(51) Int. Cl.
| | | |
|---|---|---|
| G01Q 30/20 | (2010.01) | |
| G01Q 60/16 | (2010.01) | |
| G01Q 60/10 | (2010.01) | |
| G01Q 60/00 | (2010.01) | |

(52) U.S. Cl.
CPC .............. G01Q 30/20 (2013.01); G01Q 60/16 (2013.01); G01Q 60/10 (2013.01); G01Q 60/00 (2013.01)

(58) Field of Classification Search
CPC ....... G01Q 30/20; G01Q 60/00; G01Q 60/10; G01Q 60/16
USPC ......................................... 850/18, 21, 26, 29
See application file for complete search history.

(56) References Cited

U.S. PATENT DOCUMENTS

D695,801 S    12/2013  Hagmann et al.

OTHER PUBLICATIONS

Stranick, et al ("A tunable microwave frequency alternating current scanning tunneling microscope," Rev. Sci. Instrum. 65 (4), Apr. 1994, pp. 918-921).*
Z.J. Donhauser, G.S. McCarty, L.A. Bumm and P.S. Weiss, "High resolution dopant profiling using a tunable AC scanning tunneling microscope," Proceedings of the International Conference on Characterization and Metrology for ULSI Technology (2001) 641-646. (Fig. 2).
L. Arnold, W. Krieger and H. Walther, "Laser-frequency mixing in the junction of a scanning tunneling microscope," Appl. Phys. Lett. 51 (1987) 786-788. (Fig. 1).
A. Imtiaz, T.M. Wallis, S.-H. Lim, H. Tanbakuchi, H.P. Huber, A. Hornung, P. Hinterdorfer, J. Smoliner, F. Kienberger and P. Kabos, "Frequency-selective contrast on variably doped p-type silicon with a scanning microwave microscope," J. Appl. Phys. 111 (2012) 093727 (6 pp). (Fig. 1a).

(Continued)

*Primary Examiner* — Michael Maskell
(74) *Attorney, Agent, or Firm* — Dobbin IP Law P.C.; Geoffrey E. Dobbin

(57) ABSTRACT

A method for coupling high-frequency energy, in particular for microwave circuits, to a nanoscale junction involves placing a bias-T outside of the tip and sample circuits of a scanning probe microscope and connecting a portion of a sample of analyzed semi-conductor through an outer shielding layer of coaxial cable so as to complete a circuit with minimal involvement of the sample. The bias-T branches into high and low-frequency circuits, both of which are completed and, at least the high-frequency circuit, does not rely on grounding of implements or other structure to accomplish said completion.

16 Claims, 7 Drawing Sheets

(56) References Cited

OTHER PUBLICATIONS

H.P. Huber, I. Humer, M. Hochleitner, M. Fenner, M. Moertelmaier, C. Rankl, A. Imitaz, T.M. Wallis, H. Tanbakuchi, P. Hinterdorfer, P. Kabos, J. Smoliner, J.J. Kopanski and F. Lienberger, "Calibrated nanoscale dopant profiling using a scanning microwave microscope," J. Appl. Phys. 111 (2012) 014301 (9 pp). (Fig. 1a).
C. Durkan and M.E. Welland, "Electronic spin detection in molecules using scanning-tunneling-microscopy-assisted electron-spin resonance," Appl. Phys. Lett. 80 (2002) 458-460. (Fig. 1).
U. Kemiktarak, T. Ndukum, K.C. Schwab and K.L. Ekinci, "Radio-frequency scanning tunneling microscopy," Nature Letters 450 (2007) 85-89. (Fig. 1a).
T. Kokubo, A. Gallagher and J.L. Hall, "Optical heterodyne detection at a silver scanning tunneling microscope junction," J. Appl. Phys. 85 (1999) 1311-1316. (Fig. 1).
M.J. Hagmann, A. Efimov, A.J. Taylor and D.A. Yarotski, "Microwave frequency-comb generation in a tunneling junction by intermode mixing of ultrafast laser pulses," Appl. Phys. Lett. 99 (2011) 011112 (3 pp). (p. 2, col. 1).
S.S. Stranick and P.S. Weiss, "A tunable microwave frequency alternating current scanning tunneling microscope," Rev. Sci. Instrum. 65 (1994) 918-921. (Fig. 1).
C. Sammet, M. Volcker, W. Krieger and H. Walther, "Optical mixing of CO2-laser radiation in a scanning tunneling microscope," J. Appl. Phys. 78 (1995) 6477-6480. (Fig. 1).
B. Michel, W. Mizutani, R. Schlerle, A. Jarosch, W. Knop, H. Bendickter, W. Bachtold and H. Rohrer, "Scanning surface harmonic microscopy: Scanning probe microscopy based on microwave field-induced harmonic generation," Rev. Sci. Instrum. 63 (1992) 4080-4085. (Fig. 2).
G.P. Kochanski, "Nonlinear alternating-current tunneling microscopy," Phys. Rev. Lett. 62 (1989) 2285-2288. (Fig. 1).
J. Lee, X. Tu and W. Ho, "Spectroscopy and microscopy of spin-sensitive rectification current induced by microwave radiation," Nano Lett. 5 (2005) 2613-2617. (Fig. 1a).
R. Giridharagopal, J. Zhang and K.F. Kelly, "Antenna-based ultrahigh vacuum microwave frequency scanning tunneling microscopy systems," Rev. Sci. Instrum. 82 (2011) 053710 (7 pp). (Fig. 1a).
W. Seifert. E. Gerner, M. Stachel and K. Dransfeld, "Scanning tunneling microscopy at microwave frequencies," Ultramicroscopy 42 (1992) 379-387.
J. Schmidt, D.H. Rapoport, G. Behme and H.-J. Frohlich, "Microwave-mixing scanning capacitance microscopy of pn junctions," Junctions, J. Appl. Phys. 86 (1999) 7094-7099.
M.J. Hagmann, "Microwave tunneling current from the resonant interaction of an amplitude modulated laser with a scanning tunneling microscope," J. Vac. Sci. Technol. B 14 (1996) 838-841.
W. Krieger, A. Hornsteiner, E. Soergel, C. Sammet, M. Volcker and H. Walther, "Laser-driven scanning tunneling microscopy," Laser Physics 6 (1996) 334-338.
C.C. Williams, "Two-dimensional dopant profiling by scanning capacitance microscopy," Ann. Rev. Mater. Sci. 29 (1999) 471-504.
M.H. Bhuyan, F.M. Mohammedy and Q.D.M. Khosru, "Doping profile measurement and characterization by scanning capacitance microscope for pocket implanted nanoscale n-MOSFET," Int. J. Electr. Electron. Eng. 5 (2011) 260-267.
H.P. Huber, M. Moertelmaier, T.M. Wallis, C.J. Chiang, M. Hochleitner, A. Imtaz, Y.J. Oh, K. Schilcher, M. Dieudonne, J. Smoliner, P. Hinterdorfer, S.J. rosner, H. Tanbakuchi, P. Kabos and F. Kienberger, "Calibrated nanoscale capacitance measurements using a scanning microwave microscope," Rev. Sci. Instrum. 81 (2010) 113701 (9 pp).
M.J. Hagmann, A.J. Taylor and D.A. Yarotski, "Observation of 200th harmonic with fractional linewidth of 10-10 in a microwave frequency comb generated in a tunneling junction," Appl. Phys. Lett. 101 (2012) 241102 (3 pp).
M.J. Hagmann, S. Pandey, A. Nahata, A.J. Taylor and D.A. Yarotski, "Microwave frequency comb attributed to the formation of dipoles at the surface of a semiconductor by a mode-locked ultrafast laser," Appl. Phys. Lett. 101 (2012) 231102 (3 pp).
T. Komeda and Y. Manassen, "Distribution of frequencies of a single precessing spin detected by scanning tunneling microscope," Appl. Phys. Lett. 92 (2008) 212506 (3 pp).
L.A. Bumm and P.S. Weiss, "Small cavity nonresonant tunable microwave-frequency alternating current scanning tunneling microscope," Rev. Sci. Instrum. 66 (1995) 4140-41145.
C. Saunus, J.R. Bindel, M. Pratzer and M. Morgenstern, "Versatile scanning tunneling microscopy with 120 ps time resolution," Appl. Phys. Lett. 102 (2013) 051601 (4 pp).
D.-J. Kim and J.-Y. Koo, "A low-noise and wide-band ac boosting current-to-voltage amplifier for scanning tunneling microscopy," Rev. Sci. Instrum. 76 (2005) 023703 (4 pp).
F. Demming, K. Dickmann and J. Jersch, "Wide bandwidth transimpedance preamplifier for a scanning tunneling microscope," Rev. Sci. Instrum. 69 (1998) 2406-2408.
F. Keilmann, D.W. van der Weide, T. Eickelkamp, R. Merz and D. Stockle, "Extreme sub-wavelength resolution with a scanning radio-frequency transmission microscope," Optics Comm. 129 (1996) 15-18.
A. Kramer, F. Keilmann, B. Knoll and R. Guckenberger, "The coaxial tip as a nano-antenna for scanning near-field microwave transmission microscopy," Micron 27 (1996) 413-417.
M. Tabib-Azar and Y. Wang, "Design and fabrication of scanning near-field microwave probes compatible with atomic force microscopy to image embedded nanostructures," IEEE Trans. Microwave Theory Tech. 52 (2004) 971-979.
U. Ch. Fischer and M. Zapletal, "The concept of a coaxial tip as a probe for scanning near field optical microscopy and steps towards a realization," Ultramicroscopy 42-44 (1992) 393-398.
J.J. Kopanski, J.F. Marchiando and J.R. Lowney, "Scanning capacitance microscopy measurements and modeling: Progress towards dopant profiling of silicon," J. Vac. Sci. Technol. B 14 (1996) 242-247. (Fig. 7a).
J.F. Marchiando, J.R. Lowney and J.J. Kopanski, "Models for interpreting scanning capacitance microscope measurements," Conference Digest for Scanning Microscopy, vol. 12, (1998) 205-224.
J.A. Strosscio and W.J. Kaiser, eds., Scanning Tunneling Microscopy, Academic Press, Boston, 1993, pp. 71-73.
E. Flaxer, "Bias-controlled mechanism for a scanning tunneling microscope," Meas. Sci. Technol. 17 (2006) N45-N47.
S. Guo, J. Hihath and N. Tao, "Breakdown of atomic-sized metallic contacts measured on nanosecond scale," Nano Lett. 11 (2011) 927-933.
M. Ochmann, H.-J. Munzer, J. Boneberg and P. Leiderer, "A circuit for measuring the gap voltage of a scanning tunneling microscope on a nanosecond time scale," Rev. Sci. Instrum. 70 (1999) 2049-2052.

\* cited by examiner

METHOD AND MEANS FOR COUPLING HIGH-FREQUENCY ENERGY TO AND/OR FROM THE NANOSCALE JUNCTION OF AN ELECTRICALLY-CONDUCTIVE TIP WITH A SEMICONDUCTOR

FIELD OF THE INVENTION

The present invention relates to the field of microscopy and more particularly relates to a method for coupling high-frequency energy with a nanoscale junction, such as when analyzing a semiconductor in scanning probe microscopy with a scanning tunneling microscope or an atomic force microscope.

BACKGROUND OF THE INVENTION

Summary of the Present Art and its Limitations

Others have coupled high-frequency energy to and/or from the tip-sample junction in scanning probe microscopy (SPM) by using the following six methods:
1. A bias-T in the tip-circuit (FIG. 9);
2. A bias-T in the sample-circuit (FIG. 10);
3. A bias-T in both the tip and sample circuits (FIG. 11);
4. A microwave horn antenna (FIG. 12);
5. A microwave cavity (FIG. 13); and
6. A coil around the tip (FIG. 14).

Each of these six methods is known to provide inefficient and non-reproducible coupling. For example, in method (6), described in R. Giridharagopal, J. Zhang and K. F. Kelly, "Antenna-based ultrahigh vacuum microwave frequency scanning tunneling microscopy systems," (Rev. Sci. Instrum. 82 (2011) 053710) ("Giridharagopal") and J. Lee, X. Tu and W. Ho, "Spectroscopy and microscopy of spin-sensitive rectification current induced by microwave radiation," (Nano Lett. 5 (2005) 2613-2617) ("Lee"), if the tunneling current passes through the center of the coil and is normal to the plane containing the coil, there will be no coupling between the current and the coil, and this is exactly the configuration that is shown in the figures of both Giridharagopal and Lee. A toroid must be used instead of a simple coil for effective coupling by this method, but this has never been described. Thus, the only way in which any coupling has been achieved in Giridharagopal or Lee has been imperfect symmetry in their design. Furthermore, in Giridharagopal the coil is shown to be connected to coaxial cable for shielding, but this shielding would be ineffective without the use of a Balun which is not shown in the figures or mentioned in the text. Thus, method (6) will not be given further consideration in this document.

The use of a microwave cavity in method (5) can provide good shielding from other sources of high-frequency energy, as is shown in G. P. Kochanski, "Nonlinear alternating-current tunneling microscopy," (Phys. Rev. Lett. 62 (1989) 2285-2288) and B. Michel, W. Mizutani, R. Schlerle, A. Jarosch, W. Knop, H. Bendickter, W. Bachtold and H. Rohrer, "Scanning surface harmonic microscopy: Scanning probe microscopy based on microwave field-induced harmonic generation," (Rev. Sci. Instrum. 63 (1992) 4080-4085), but it is cumbersome to implement and limits the measurements to the resonant frequencies of the cavity. Thus, method (5) will not be given further consideration in this document.

In method (4) the coupling is dependent upon the radiation pattern due to the size and shape of the electrical connections to the tunneling junction, which has never been addressed, as well as the aperture of the horn (C. Sammet, M. Volcker, W. Krieger and H. Walther, "Optical mixing of CO2-laser radiation in a scanning tunneling microscope," (J. Appl. Phys. 78 (1995) 6477-6480)). Thus, the coupling is frequency-dependent, has low efficiency, and is poorly defined. Furthermore, a shielded room must be used to limit the coupling to other sources. Thus, method (4) will not be given further consideration in this document.

It is our experience that the coupling is inefficient in method (2), because the high-frequency circuit is only completed by the high-loss and frequency-dependent path to ground through the stray capacitance of the unshielded bare wire lead from the tip, as well as the limited high-frequency response of the virtual ground at the input of the preamplifier in the tip circuit of the scanning tunneling microscope (STM) (M. J. Hagmann, A. Efimov, A. J. Taylor and D. A. Yarotski, "Microwave frequency-comb generation in a tunneling junction by intermode mixing of ultrafast laser pulses," (Appl. Phys. Lett. 99 (2011) 011112)). In the corresponding case for method (1) the high-frequency circuit is ineffectively completed by the high-loss and frequency-dependent path to the ground connection in the bias supply for the STM (L. Arnold, W. Krieger and H. Walther, "Laser-frequency mixing in the junction of a scanning tunneling microscope," (Appl. Phys. Lett. 51 (1987) 786-788)) or the sample holder and its mounting hardware in scanning microwave microscopy (SMM) (A. Imtiaz, T. M. Wallis, S.-H. Lim, H. Tanbakuchi, H. P. Huber, A. Hornung, P. Hinterdorfer, J. Smoliner, F. Kienberger and P. Kabos, "Frequency-selective contrast on variably doped p-type silicon with a scanning microwave microscope," (J. Appl. Phys. 111 (2012) 093727) and H. P. Huber, I. Humer, M. Hochleitner, M. Fenner, M. Moertelmaier, C. Rankl, A. Imitaz, T. M. Wallis, H. Tanbakuchi, P. Hinterdorfer, P. Kabos, J. Smoliner, J. J. Kopanski and F. Lienberger, "Calibrated nanoscale dopant profiling using a scanning microwave microscope," (J. Appl. Phys. 111 (2012) 014301)), electronic spin detection (C. Durkan and M. E. Welland, "Electronic spin detection in molecules using scanning-tunneling-microscopy-assisted electron-spin resonance," (Appl. Phys. Lett. 80 (2002) 458-460) ("Durkan"), and measurement of the tunneling resistance (U. Kemiktarak, T. Ndukum, K. C. Schwab and K. L. Ekinci, "Radio-frequency scanning tunneling microscopy," (Nature Letters 450 (2007) 85-89) However, Donhauser et al (Z. J. Donhauser, G. S. McCarty, L. A. Bumm and P. S. Weiss, "High resolution dopant profiling using a tunable AC scanning tunneling microscope," (Proceedings of the International Conference on Characterization and Metrology for ULSI Technology (2001) 641-646)) did complete the high-frequency circuit by having a second cable connected to the sample. Also, in method (3), Stranick and Weiss (S. S. Stranick and P. S. Weiss, "A tunable microwave frequency alternating current scanning tunneling microscope," (Rev. Sci. Instrum. 65 (1994) 918-921)) used a bias-T in both the tip and sample circuits which also completes the high-frequency circuit.

In summary, with the exceptions of the work by Donhauser et al. and Stranick and Weiss, which will be considered separately, the present art fails to describe means to couple high-frequency energy to and/or from the tip-sample junction in scanning probe microscopy that provide efficient and reproducible coupling over a large usable bandwidth with good shielding from other sources of high-frequency energy.

Seven Examples for Applications of Scanning Probe Microscopy

This innovation addresses the need to provide efficient and reproducible broad-band coupling of high-frequency energy to and/or from the nanoscale junction of an electrically-conductive tip and a sample, with specific emphasis on the characterization of semiconductor samples by SPM. Some of the examples of technologies where this innovation could be applied are as follows:

1. Scanning Surface Harmonic Microscopy (SSHM). In SSHM, a STM is operated in a microwave cavity, and a high-frequency electric field is superimposed on the DC electric field from the bias voltage which is applied between the tip and the semiconductor sample. The DC bias causes depletion in the semiconductor, and the depth of the depletion region varies as a function of time, because it depends on the instantaneous value of the total electric field. Thus, the depletion capacitance also varies as a function of time, and this nonlinear behavior causes the tunneling current to have harmonics at integer multiples of the frequency of the applied high-frequency electric field. Measurements of the tunneling current at the harmonics, made for different values of the applied DC bias, permit determining the depletion capacitance as a function of the applied DC voltage, which enables calculation of the dopant concentration in the semiconductor. Closely related work in which the second and third harmonics were measured using semiconductor samples in a STM was described by others (W. Seifert. E. Gerner, M. Stachel and K. Dransfeld, "Scanning tunneling microscopy at microwave frequencies," (Ultramicroscopy 42 (1992) 379-387)).

2. Alternating Current Scanning Tunneling Microscopy (ACSTM). In ACSTM, as described by Donhauser et al. and Stranick and Weiss, high-frequency electric fields at two different frequencies are superimposed on the DC electric field from the bias voltage which is applied between the tip and the semiconductor sample. The DC bias causes depletion in the semiconductor, and the depth of the depletion region varies as a function of time, because it depends on the instantaneous value of the total electric field. Thus, the depletion capacitance also varies as a function of time, and this nonlinear behavior causes the tunneling current to have a component at the mixer frequency which is equal to the difference of the frequencies for the two applied high-frequency electric fields. Measurements of the tunneling current at the mixer frequency, made for different values of the applied DC bias, permit determining the depletion capacitance as a function of the applied DC voltage, which enables calculation of the dopant concentration in the semiconductor. Closely related work in which the sum frequency and third harmonic were measured using semiconductor samples was described by others (j. Schmidt, D. H. Rapoport, G. Behme and H.-J. Frohlich, "Microwave-mixing scanning capacitance microscopy of pn junctions," (J. Appl. Phys. 86 (1999) 7094-7099, pg. 1097)).

3. STM-Photomixing. In STM-Photomixing the radiation from two lasers is focused on the tunneling junction of a STM so that the electric fields at the two different frequencies are superimposed on the DC electric field from the bias voltage which is applied between the tip and the sample. The tunneling current is a nonlinear function of the total electric field, so that the tunneling current has a component at the mixer frequency which is equal to the difference of the frequencies of the two lasers. The lasers may be adjusted so that the mixer frequency is tuned over a wide range of microwave frequencies. It is also possible to modulate the amplitude of a single laser to create a high-frequency component of the tunneling current at the modulation frequency (M. J. Hagmann, "Microwave tunneling current from the resonant interaction of an amplitude modulated laser with a scanning tunneling microscope," (J. Vac. Sci. Technol. B 14 (1996) 838-841, pg. 838)). STM-Photomixing has not yet been used for dopant profiling, but it has been used to determine the electrical resistance of metals at nanoscale (W. Krieger, A. Hornsteiner, E. Soergel, C. Sammet, M. Volcker and H. Walther, "Laser-driven scanning tunneling microscope," (Laser Physics 6 (1996) 334-338)).

4. Scanning Capacitance Microscopy (SCM). In SCM an atomic force microscope (AFM) is used to scan a metallic tip across the oxide layer at the surface of a semiconductor and a DC bias voltage is applied to the semiconductor to cause a depletion region which may be varied in depth by changing the voltage. This is described by C. C. Williams ("Two-dimensional dopant profiling by scanning capacitance microscopy," (Ann. Rev. Mater. Sci. 29 (1999) 471-504)) and Bhuyan, et al. (M. H. Bhuyan, F. M. Mohammedy and Q. D. M. Khosru, "Doping profile measurement and characterization by scanning capacitance microscope for pocket implanted nanoscale n-MOSFET," (Int. J. Electr. Electron. Eng. 5 (2011) 260-267)). Thus, the depletion capacitance may be varied by changing the applied DC bias. An oscillator, typically at 915 MHz, is coupled to a detection circuit through a resonant circuit which includes the depletion capacitance. The detection circuit consists of a diode rectifier, a low-pass filter, and a DC amplifier (Williams). The DC output of the detection circuit is proportional to the signal from the resonant circuit, which changes sharply with small changes in the depletion capacitance. The measured DC output may be calibrated and used as a measure of the depletion capacitance. Thus, it is possible to determine the capacitance of the depletion region as a function of the DC voltage which is applied to the semiconductor, and the dopant concentration may be determined from these values.

5. Scanning Microwave Microscopy (SMM). In SMM an atomic force microscope (AFM) is used to scan a metallic tip across the oxide layer on a semiconductor, to form a movable metal-oxide-semiconductor (MOS) junction. A network analyzer is connected to the metallic tip by means of a transmission line, and the oscillator in the network analyzer generates a forward wave propagating toward the tip and measures the reflected wave to determine the S-parameter $S_{11}$, which is the reflection coefficient. It has been shown that the value of $S_{11}$ may be used to measure a total capacitance which includes the capacitance between the cantilever of the AFM and the semiconductor, the capacitance of the oxide layer on the semiconductor, and the capacitance caused by a region of the semiconductor (H. P. Huber, M. Moertelmaier, T. M. Wallis, C. J. Chiang, M. Hochleitner, A. Imtiaz, Y. J. Oh, K. Schilcher, M. Dieudonne, J. Smoliner, P. Hinterdorfer, S. J. Rosner, H. Tanbakuchi, P. Kabos and F. Kienberger, "Calibrated nanoscale capacitance measurements using a scanning microwave microscope," (Rev. Sci. Instrum. 81 (2010) 113701)). Thus, it is possible to determine the dopant concentration by measuring the capacitance as a function of the DC voltage which is applied to the semiconductor, in a manner that is similar to SCM except that the capacitance measurement circuit is replaced by a network analyzer.

6. Scanning Frequency Comb Microscopy (SFCM). Applicant has published in the field of SFCM, and incorporates these articles by reference in their entirety: M. J. Hagmann, A. Efimov, A. J. Taylor and D. A. Yarotski, "Microwave frequency-comb generation in a tunneling junction by intermode mixing of ultrafast laser pulses," (Appl. Phys. Lett. 99 (2011) 011112); M. J. Hagmann, A. J. Taylor and D. A. Yarotski, "Observation of 200th harmonic with fractional linewidth of 10-10 in a microwave frequency comb generated in a tunneling junction," (Appl. Phys. Lett. 101 (2012) 241102) and M. J. Hagmann, S. Pandey, A. Nahata, A. J. Taylor and D. A. Yarotski, "Microwave frequency comb attributed to the formation of dipoles at the surface of a semiconductor by a mode-locked ultrafast laser," (Appl. Phys. Lett. 101 (2012) 231102) ("Hagmann 1, 2 and 3" respectively). In SFCM, the radiation from a mode-locked ultrafast laser is focused on the tunneling junction of a STM, so that the electric field of the radiation is superimposed on the DC electric field from the bias voltage which is applied between the tip and the sample. The tunneling current is a nonlinear function of the total electric field, so that a periodic sequence of pulses, corresponding to the envelope of the pulse train of the mode-locked laser, is superimposed on the DC tunneling current. In the frequency domain, the spectrum consists of a series of harmonics at integer multiples of the pulse repetition frequency of the laser, having an appearance that causes the spectrum to be called a "microwave frequency comb". This technique is being considered as a means for the two-dimensional and three-dimensional characterization of semiconductors by procedures that are similar to those in SCM and SMM. However, much finer resolution is possible because of the sub-nm diameter of the tunneling junction.

7. Electronic Spin Detection in Molecules (ESDM). In ESDM the electron spin in single molecules at surfaces may be detected by operating the STM in a magnetic field and examining the spectrum of the tunneling current with a spectrum analyzer. This is described by Durkan (above) and by T. Komeda and Y. Manassen, "Distribution of frequencies of a single precessing spin detected by scanning tunneling microscope" (Appl. Phys. Lett. 92 (2008) 212506). In order to see single spins, it is necessary to use a substrate that does not contain free spins because they would interfere with the measurement. Signals at the Larmor (precession) frequency are present in the spectrum.

Comments on the Implementations Used in the Seven Examples

SSHM has only been used with resonant cavities, but ACSTM has the same mechanism and it has also used with resonant cavities, as is shown by L. A. Bumm and P. S. Weiss, "Small cavity nonresonant tunable microwave-frequency alternating current scanning tunneling microscope," (Rev. Sci. Instrum. 66 (1995)); but, more recently ACSTM has been used with high-frequency circuits that are completed and shielded with coaxial cables to provide good shielding from other sources of high-frequency energy while also providing the capability for wide-band measurements, as is shown by Donhauser et al. and Stranick and Weiss. Thus, SSHM and ACSTM may be grouped with other related methods to form a class in which one or more high-frequency signals are incident on the tunneling junction of a STM to create one or more high-frequency signals at harmonics or mixer frequencies. We call this class SSHM/ACSTM, and the apparatus used for these measurements has some similarities to that which is now used in ACSTM.

However, when using two cables the circuit cannot be fully completed because there is a gap between the outer conductors of the two cables near the tip-sample junction. While Donhauser et al. and Stranick and Weiss do not give the reason for this gap, said gap would be required to prevent ground loops which would be caused by the different grounds in the apparatuses that are connected at the distant ends of the two cables. If it were possible to have grounded apparatus at only one of the two distant ends of the cables, then the outer conductors of the two cables could be connected around the sample, but the size of the connecting structure must exceed the volume which is occupied by the semiconductor so the resonances of this structure would limit the usable bandwidth for the instrument. Other more recent high-frequency applications of STM which are also limited by the use of two separate cables may also be considered (C. Saunus, J. R. Bindel, M. Pratzer and M. Morgenstern, "Versatile scanning tunneling microscopy with 120 ps time resolution," (Appl. Phys. Lett. 102 (2013) 051601)).

STM-Photomixing has been used with a bias-T in the tip-circuit or a bias-T in the sample circuit which fails to complete the high-frequency circuit. A microwave horn antenna has also been used, and the deficiencies in these three methods have already been addressed.

In SCM and SMM it is necessary to couple high-frequency energy with the junction and as well as to apply a DC bias voltage, so that a bias-T is used in the tip circuit. Measurement of the electron spin in a paramagnetic sample with a STM has also been done using a bias-T in the tip circuit. As already noted, this method fails to complete the high-frequency circuit.

In SFCM it is necessary to couple high-frequency energy from the tunneling junction as well as to apply a DC bias voltage, so that a bias-T has been used in the sample circuit, but as noted earlier, this does not satisfactorily complete the high-frequency circuit.

The objective of the present innovation is to provide a means for overcoming the limitations that have just been listed for the seven specific topics for application. Specifically, the method completes the high-frequency circuit without causing noise from ground loops, unlike prior art methods.

SUMMARY OF THE INVENTION

In view of the foregoing disadvantages inherent in the known types of coupling methods in scanning probe microscopy, this invention provides a new method and apparatus for coupling high-frequency energy with a nanoscale junction. As such, the present invention's general purpose is to provide a new and improved method and apparatus that is simple, effective and delivers consistent results.

To accomplish these objectives, the method comprises a bias-T linking a scanning probe microscope to a low-frequency/DC circuit and a high-frequency circuit; and, through these branches of the bias-T, appropriate measurement equipment is connected to the scanning probe microscope. It is fundamental to this innovation that both the high-frequency circuit and the low-frequency/DC circuit are electrically closed and fully defined, having no reliance on connections through the grounds of the various instruments or transmission through electrically-conductive components such as the sample holder or other mechanical apparatus. Furthermore, the bias-T, with the high-frequency and low-frequency circuits are connected to one end of a transmission line where the tip-sample junction is at one end of said transmission line and all of the electrical connections to the low-frequency/DC and/or high-frequency sources and/or measurement apparatus are made at the opposite end of said transmission line. Thus, all of the grounds for the sources and measurement apparatus are connected to a single point to mitigate the effects of ground loops. It is also to be understood that a bias-T is a three-port device utilized to separate high and low-frequency currents. Many different structures, for example a simple series inductor and capacitor, may be utilized to accomplish this goal. Therefore, the term "bias-T" should be read to include any equivalent structure, now known or later discovered in the art, which accomplishes this function.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the method for connecting high-frequency energy with a nanoscale junction is herein described. It should be noted that the articles "a", "an", and "the", as used in this specification, include plural referents unless the content clearly dictates otherwise.

Description of the Transmission Line:

The choice of 50Ω for the impedance of the coaxial transmission line facilitates the use of a bias-T at the end of said transmission line where all of the connections are made, in order to separate the DC and low-frequency circuit (e.g. bias voltage supply, current preamplifier for the STM control electronics, etc.) from the high-frequency circuit (e.g. spectrum analyzer, oscilloscope, network analyzer, oscillator, etc.). In order to maintain the mechanical stiffness that is needed in SPM, it is reasonable to use a section of miniature semi-rigid coaxial cable, such as UT-013 from Micro-Coax (Pottstown, Pa., USA) which has an outer diameter of 0.330 mm. Said type of cable has an outer conductor of solid copper and a center conductor of silver-plated copper wire with an outer diameter of 0.0787 mm, separated by a dielectric of PTFE. In some applications, where transmission lines having lower capacitance or greater characteristic impedance are required, it would be appropriate to use miniature two-wire transmission line with a balanced circuit.

Figure 1:
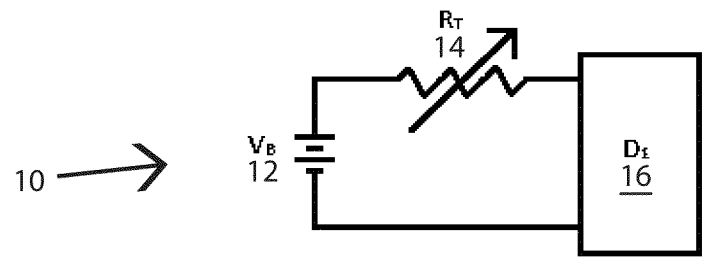
FIG. 1 is a schematic of a simple DC equivalent circuit for a STM.

A simple DC equivalent circuit 10 for a STM is shown in FIG. 1, where $V_B$ 12 is the applied bias voltage, $R_T$ 14 is the voltage-dependent resistance of the tunneling junction that is typically from 1 MΩ to 1 GΩ, and $D_1$ 16 is a detector. If the objective were to maximize the power that is coupled to the detector, it would be necessary for the detector to have a resistance equal to that of $R_T$. However, generally a transimpedance amplifier is used to measure the tunneling current, and this type of detector has a virtual ground at the input for an impedance of approximately zero. One reason for this choice for the detector is to avoid having a voltage drop across the detector so that the voltage across the tunneling junction is better defined, being approximately equal to $V_B$. The transimpedance amplifiers that are used in STMs generally have a bandwidth of several kHz, but others may be used at frequencies as high as 35 MHz.

It may be surprising that impedance matching is seldom used, even at microwave frequencies, in STM or any of the other specific topics for applications that are listed earlier. Only narrow-bandwidth active circuits can be used to provide impedance matching because of the extremely large and variable effective resistance of the tunneling junction. Impedance matching has been used in topic 7, ESDM but similar high-sensitivity measurements of the electron spin in single molecules have also been made without impedance matching. Impedance matching was also used to enable measurements of the tunneling resistance in STM.

Figure 2:
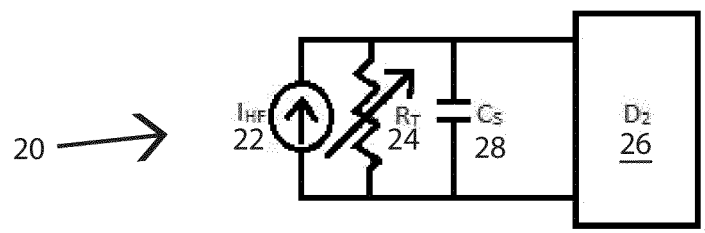
FIG. 2 is a schematic of a simple high-frequency equivalent circuit for a STM.

A simple high-frequency equivalent circuit 20 for a STM is shown in FIG. 2. The mechanisms which are described for the seven specific topics for applications in the Background of the Invention of this Specification show that four of them (SSHM, ACSTM, SSTM-Photomixing, and SFCM) specifically generate high-frequency tunneling currents. The other three (SCM, SMM, and ESDM) may also be considered as current sources because of the high impedance of the nanoscale junction. Thus, in the high-frequency equivalent circuit, the signal is represented as an ideal high-frequency constant current source $I_{HF}$ 22. The capacitance shunting the junction, $C_S$ 28, is primarily parasitic capacitance associated with the connections, and the detector is labeled $D_2$ 26. The tunneling resistance $R_T$ 24 generally has a negligible effect at high frequencies because of its large value, typically between 1 MΩ and 1 GΩ. This circuit model shows that there is current division between the shunting capacitance and the detector which has an impedance of $R_L$. Note that the power delivered to the detector is given by $$P_L = \frac{R_L I_0^2}{2(1 + \omega^2 R_L^2 C_S^2)} \quad (1)$$

Here ω is the angular frequency of the current. Equation (1) shows that at high frequencies $$P_L = \frac{I_0^2}{2\omega^2 R_L C_S^2} \quad (2)$$

Thus, in high-frequency measurements the power that is delivered to the load is increased by using a detector with low impedance. In measurements with instruments that typically have an input impedance of 50Ω, it is convenient to use a transmission line with this value of impedance as has already been mentioned. The use of 50Ω transmission line with a spectrum analyzer is particularly effective in measurements of hundreds of the microwave harmonics in the present implementation of SFCM, but further improvement in the usable bandwidth would be obtained by using the innovation in place of the use of only having a bias-T in the sample-circuit.

Equation (1) shows that for a junction having a specific value of the shunting capacitance, at a specific operating frequency there is a value of load resistance for which the maximum power is delivered to the load: $R_{L_{OPT}} = 1/\omega C_S$. For example, $R_L = 50\Omega$ is optimum for a frequency of 3.2 GHz when $C_S = 1$ pF, and for 320 MHz when $C_S = 10$ pF. These are typical values of the shunting capacitance, and typical of the frequencies that are used in all of the high-frequency applications that we have considered: SSHM, ACSTM, STM-Photomixing, SCM, SMM, SFCM, and ESDM. Frequency values thus vary inversely with the shunting capacity and the invention have been tested for frequencies from 500 Hz to 15 GHz. Furthermore, this optimum is rather broad. If the frequency or the shunting capacitance were increased or decreased by a factor 10 the power delivered to the load would only be reduced by a factor of 5 when using 50Ω. Also, if the frequency or the shunting capacitance were increased or decreased by a factor of 100 the power would only be reduced by a factor of 50 when using 50Ω. Thus, it is practical to use 50Ω semi-rigid coaxial cable such as UT-013 from Micro-Coax (Pottstown, Pa., USA) which has an outer diameter of 0.330 mm, whereas UT-044C-5 with 5Ω impedance and OD=1.12 mm, and UT-034-95 with 95Ω impedance and OD=0.864 mm are also available.

Connection of the Transmission Line to the Tip-Sample Junction:

At the end of the coaxial transmission line with the tip-sample junction, the tip is connected to the center conductor of said transmission line. For example, this connection may be made by crimping a small metal tube over the tip and the center conductor. It is possible to reduce the shunting capacitance, thereby increasing the usable bandwidth, by insulating part of the tip and covering the insulated section with a metal tube as a short extension of the coaxial cable. Others have described how to make miniature tapered coaxial tips as an alternative means to provide this additional shielding to reduce the shunting capacitance.

Figure 7:
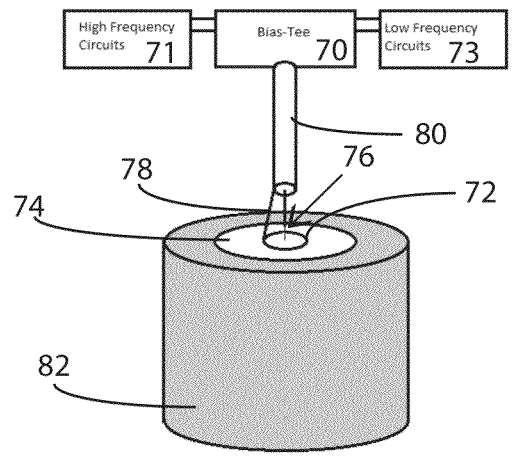
FIG. 7 is a perspective view of a preferred scanning probe microscope setup, including the sample holder and bias-T where the sample is moved for scanning.

It is fundamental to this innovation that the outer conductor of the coaxial transmission line is connected directly to the semiconductor as close as possible to the tip without interfering with either the scanning operation of the SPM or the phenomena that are being measured in the semiconductor. Thus closer contact is needed than what is provided with the traditional method of making electrical contact with the sample through a sample holder. This change is necessary to minimize the volume of the semiconductor that is contained in the tip-sample circuit, in order to reduce the pickup of noise and increase the usable bandwidth for the measurements. Typically this is accomplished by having a conductive circular wire, annulus, or ring ("ring") 72 attached to the sample 74, usually a semiconductor, preferably making an ohmic contact or other low resistance connection with the semiconductor, said ring being approximately centered on the point where the tip 76 is near to the semiconductor 74 (FIG. 7). One or more fine flexible wires 78 may be used to attach the outer conductor of the coaxial transmission 80 line to the ring. It should also be noted that the eventual shape of the ring is not necessarily circular or elliptical—and shape may be used so long as it is thin, relatively flat and circumscribes an area about the tip electrode. It should be noted that for some materials, such as metals or semi-metals, a simple contact between the wire and the sample will suffice, without using a ring. The ring is utilized to gather as much of the transmitted current as possible for quantitative measurement.

Figure 3:
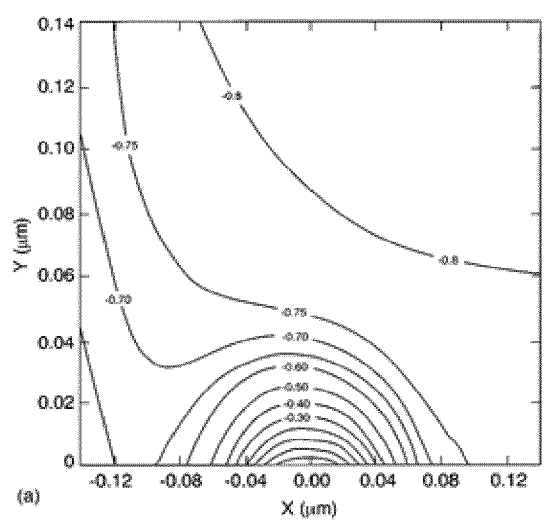
FIG. 3 is a graph depicting a simulated potential contours within a depletion region in silicon.

The following comments specifically apply to applications such as SSHM, ACSTM, SCM, SMM, and dopant profiling using SFCM, where a semiconductor sample is biased into depletion. FIG. 3 shows the potential distribution determined in a three-dimensional simulation of SCM in silicon, where the tip is biased to cause depletion (J. J. Kopanski, J. F. Marchiando and J. R. Lowney, "Scanning capacitance microscopy measurements and modeling: Progress towards dopant profiling of silicon," (J. Vac. Sci. Technol. B 14 (1996) 242-247, FIG. 7a)). Here X is the lateral dimension parallel to the surface of the semiconductor, where X=0 corresponds to the location of the tip, and Y is the depth into the semiconductor. The shape of the depletion region is approximately hemispherical at lower dopant densities, as shown in FIG. 3, but flattens at higher dopant densities due to the effects of screening. Thus, for a given dopant density and applied bias, it is possible to choose the radius for a ring to be large enough that it may be attached to the surface of the semiconductor without interfering with the measurements of the semiconductor by SCM. Moreover, the radius of the ring may be chosen such that the ring will not interfere with SCM measurements when the tip is scanned laterally over the surface of the semiconductor.

Connection of the Coaxial Transmission Line to the Sources and Measurement Apparatus:

All of the electrical connections to the sources and/or measurement apparatus are made at the opposite end of the 50Ω coaxial transmission line, where all of the ground connections made at a single point. The connection of all grounds to a single point is generally specified in STM and related technologies in order to prevent the noise that would be caused by ground loops. Preferably, the end of the transmission line is connected to a bias-T to provide two paths, one for the DC and relatively low-frequency sources and/or measurement apparatus and the other for the high-frequency sources and/or measurement apparatus.

Figure 4:
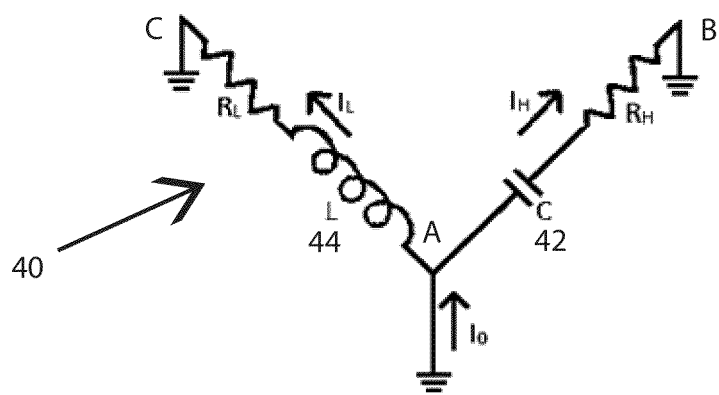
FIG. 4 is a schematic of a bias-T with resistors $R_L$ and $R_H$ added to the low-frequency and high-frequency circuits respectively.

A bias-T 40 may be considered as a capacitor 42 and an inductor 44 connected in series, to which connections are made at points A, B, and C which are the junction of the capacitor and inductor, the opposite end of the capacitor, and the opposite end of the inductor, respectively (FIG. 4). The bias-T is designed to present a 50Ω impedance at both A and B, and to have a crossover frequency $f_0$ at which the magnitude of the reactance of the capacitor is equal to the magnitude of the reactance of the inductor. Thus, at frequencies much lower than $f_0$, effectively points A and C are connected to each other with B isolated, whereas at frequencies much greater than $f_0$, effectively points A and B are connected to each other and C is isolated. For example, in measurements of the MFC in SFCM we have used a model 5545 bias-T from Picosecond Pulse Labs (Boulder, Colo.), which has a usable 3 dB bandwidth of greater than 20 GHz, a capacitance of 0.03 pF, an inductance of 340 pH, and a crossover frequency $f_0$=50 kHz. In the present innovation, the coaxial transmission line is connected to point A, the high-frequency circuit (e.g. spectrum analyzer, oscilloscope, network analyzer, oscillator, etc.) to B, and the DC and low-frequency circuit (e.g. bias voltage supply, current preamplifier for the STM control electronics, etc.) to C.

In all seven of the examples that have been listed for applications in SPM, it would be possible to use a single section of transmission line connecting the tip-sample junction to a bias-T, with all of the sources and/or measurement apparatus connected to the bias-T.

1. In SSHM, the source for the high-frequency signal and the apparatus used to measure the harmonics of this signal could be placed in the high-frequency path of the bias-T, while the bias for the STM would be placed in the path for DC and relatively low-frequencies.

2. In ACSTM, the sources for the two high-frequency signals and the apparatus used to measure the mixing signals could be placed in the high-frequency path of the bias-T, while the bias for the STM would be placed in the path for DC and relatively low frequencies.

3. In STM-Photomixing, the detector for the mixing signal could be placed in the high-frequency path of the bias-T, while the bias for the STM would be placed in the path for DC and relatively low frequencies.

4. In SCM, the circuit for measuring the depletion capacitance could be placed in the high-frequency path of the bias-T, while the bias which is applied to control the depth of the depletion region would be placed in the path for DC and relatively low frequencies.

5. In SMM, the network analyzer could be placed in the high-frequency path of the bias-T, while the bias which is applied to control the depth of the depletion region would be placed in the path for DC and relatively low frequencies.

6. In SFCM, the spectrum analyzer or other apparatus used to measure the harmonics of the MFC, could be placed in the high-frequency path of the bias-T, while the bias for the STM would be placed in the path for DC and relatively low frequencies.

7. In ESDM, the spectrum analyzer, or other apparatus used to measure the signal at the Larmor frequency, could be placed in the high-frequency path of the bias-T, while the bias for the STM would be placed in the path for DC and relatively low frequencies.

Specific Issues Regarding the Circuits that are Connected to the Bias-T:

1. The high-frequency circuit and low-frequency-circuit, which are connected to the bias-T, shift the crossover frequency from the value which is calculated considering only the capacitance and inductance of the bias-T. In order to illustrate this effect we consider the circuit in FIG. 4, where a resistor is added to the low-frequency and high-frequency circuits.

Analysis of the circuit which is shown in FIG. 4 shows that the currents in the low-frequency and high-frequency circuits are given by the following expressions:

$$I_L = \frac{\left(R_H - \frac{j}{\omega C}\right) I_0}{(R_L + R_H) + j\left(\omega L - \frac{1}{\omega C}\right)} \quad (3)$$

$$I_H = \frac{(R_L + j\omega L) I_0}{(R_L + R_H) + j\left(\omega L - \frac{1}{\omega C}\right)} \quad (4)$$

Equations (3) and (4) show that in the limit as $\omega \to 0$; $I_L \to I_0$ and $I_H \to 0$, and in the limit as $\omega \to \infty$, $I_L \to 0$ and $I_H \to I_0$, as in the case without the added resistors. However, as w becomes small, $I_H$ does not decay rapidly until $\omega < R_L/L$, and as $\omega$ becomes large, $I_L$ does not decay rapidly until $\omega > 1/R_H C$.

There are three cases of interest:

(1) The crossover frequency is increased by having $R_H$ large (e.g. 1 MΩ with an oscilloscope) and $R_L$ small (e.g. transimpedance amplifier having a virtual ground at the input).

(2) The crossover frequency is decreased by having $R_H$ small (e.g. 50Ω with a spectrum analyzer) and $R_L$ large (e.g. 100 MO for a current amplifier).

(3) When $R_H$ and $R_L$ are both large, the two resistors divide the current as they would in a DC circuit, except at very low or high frequencies.

In summary, we design the circuits connected to the bias-T such that they do not cause unwanted frequency dependence in division of the power between the low-frequency and high-frequency circuits. However, we will also present an example illustrating that a 100 k Ω resistor, shunted with a 100 pF capacitor may be connected in series with a 50Ω spectrum analyzer in the high-frequency circuit to provide a good frequency response to above 100 kHz in the low-frequency circuit even though the bias-T has a nominal crossover frequency of 50 kHz, and components with other values could be used to cause a further shift in the crossover frequency. One example of a case where it would be useful to shift the crossover frequency is fast switching of the DC bias to protect the sample, as described by E. Flaxer, "Bias-controlled mechanism for a scanning tunneling microscope," (Meas. Sci. Technol. 17 (2006) N45-N47).

Figure 5:
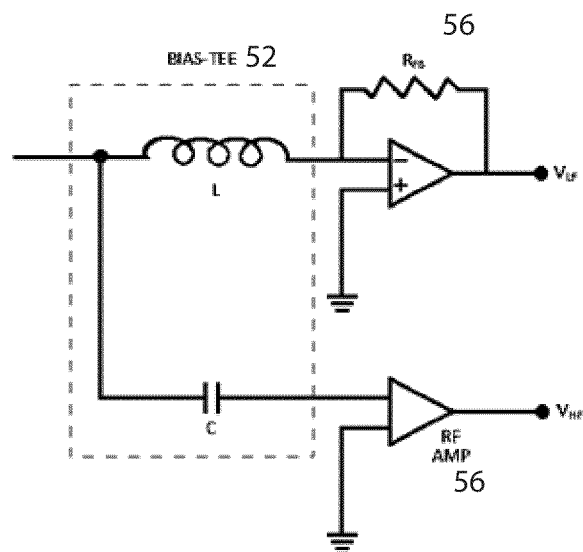
FIG. 5 is a schematic of a bias-T with high-frequency and low-frequency amplifiers.

2. Consider the case where a bias-T 52 is used to separate a high-frequency circuit in which an RF amplifier 54 with a 50Ω input impedance processes the high-frequency component of the input, and a low-frequency circuit in which a transimpedance amplifier 56 with feedback resistor $R_{FB}$ amplifies the low-frequency component, as shown in FIG. 5.

The high-frequency output may be measured with a spectrum analyzer, but a sampling oscilloscope may also be used, but with relatively high noise (S. Guo, J. Hihath and N. Tao, "Breakdown of atomic-sized metallic contacts measured on nanosecond scale," (Nano Lett. 11 (2011) 927-933)). Note in Guo that near the crossover frequency for the bias-T the inductive and capacitive reactances cancel, so that the virtual ground at the input of the transimpedance amplifier is connected to the input of the RF amplifier. The observation of high noise in time-domain measurements with low noise in frequency-domain measurements, as demonstrated in Hagmann 1, is consistent with the frequency range for the resulting instability that is caused by this effect.

3. In the applications which involve STM, such as SSHM, ACSTM, STM-Photomixing, SFCM, and ESDM, it is necessary to accurately determine the DC and low-frequency values for both the tunneling current and the potential across the tunneling junction in order to characterize the tunneling junction. Said characterization may include barrier height imaging as well as various methods of spectroscopy that require the computation of I vs. V, dI/dV, $d^2I/dV^2$, $d(\ln(I))/dz$, V vs. z, dV/dz, and other quantities, where I=current, V=voltage and Z=vertical displacement of the tip.

It has already been noted that generally a transimpedance amplifier is used to measure the tunneling current, and this type of instrument has a virtual ground at the input for an impedance of approximately zero. Thus, the voltage across the tunneling junction is better defined because it is approximately equal to the applied bias so it is possible to avoid using a separate circuit M. (Ochmann, H.-J. Munzer, J. Boneberg and P. Leiderer, "A circuit for measuring the gap voltage of a scanning tunneling microscope on a nanosecond time scale," (Rev. Sci. Instrum. 70 (1999) 2049-2052)) to determine said voltage. These features are illustrated in the following section showing a preferred circuit used with the bias-T.

Figure 6:
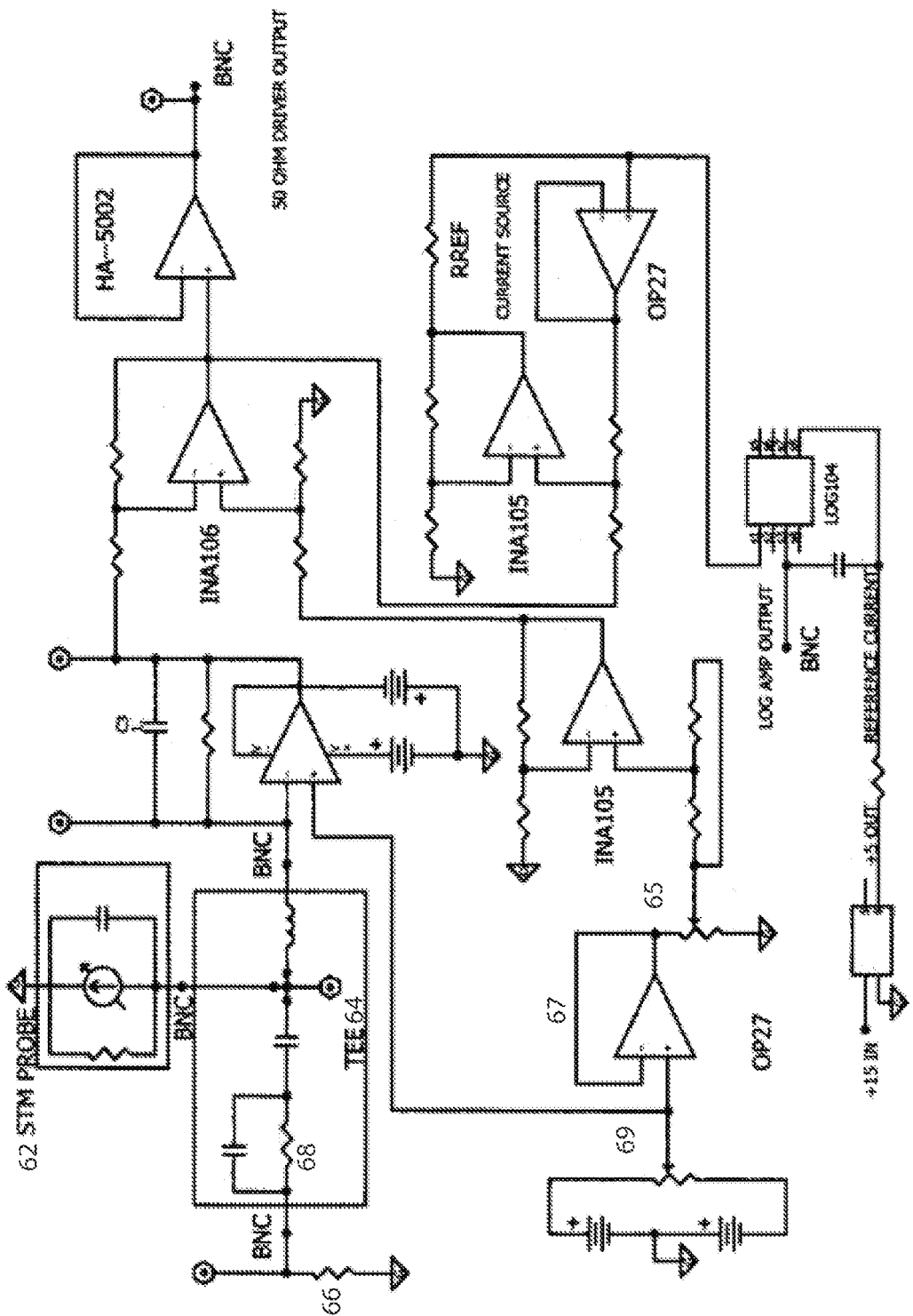
FIG. 6 is a schematic of a preferred circuit connected to a bias-T according to the teachings of the invention.

Example of a Preferred Circuit Connected to the Bias-T:

FIG. 6 is the schematic of a preferred embodiment for the circuit which is connected to the bias-T. In FIG. 6 the junction of the STM 64 is represented by an AC constant current source representing the signal that is generated in SSHM, ACSTM, STM-Photomixing, SFCM and ESDM; $C_2$ is the shunting capacitance, and $R_3$ is the tunneling resistance. The bias-T is 62 represented by $C_1$ and $L_1$, which have values consistent with the model 5545 bias-T from Picosecond Pulse Labs which we have used in measurements of the MFC in SFCM.

The high-frequency output from the bias-T is used to drive a measurement device 66, such as a spectrum analyzer with a 50Ω input impedance, which is represented by $R_2$. The low-frequency output from the bias-T is processed to generate two outputs, one being proportional to the tunneling current and buffered for use with measurement devices that may have an input impedance of 50Ω, and the other being proportional to the logarithm of the tunneling current which is convenient for feedback control of the tunneling current.

Processing of the High-Frequency Output from the Bias-T:

The parallel circuit of $R_{11}$ and $C_4$ 68, which is shown as though it were contained in the bias-T, serves to change the frequency response of said bias-T as it was described in earlier in this Specification. Here resistor $R_{11}$ causes the low-frequency circuit to have improved response at high frequencies, but the capacitor $C_4$ causes said parallel circuit to have no effect on the frequency response of the detector at the frequencies which are of interest in SSHM, ACSTM, STM-Photomixing, SFCM and ESDM. Said detector is represented by the 50 Ohm resistor $R_2$, and may be a spectrum analyzer.

Processing of the Low-Frequency Output from the Bias-T

The DC bias is controlled by $R_{14}$ 69, a 10-turn precision wire-wound multi-turn potentiometer with two small series resistors that is connected across a group of batteries that are in series in order to provide either positive or negative DC bias.

The sliding contact on $R_{14}$ is connected to the non-inverting input of $U_4$, which is a precision high-speed Difet op-amp, which is used with $R_1$ as the feedback resistor to form a transimpedance amplifier. Capacitor $C_3$ is used to limit the frequency response of said transimpedance amplifier. The virtual ground at the input of $U_4$ causes the voltage that is set by adjusting $R_{14}$ to be a good approximation of the potential across the tunneling junction, and the output of $U_4$ to be an accurate measurement of the DC and low-frequency tunneling current.

The sliding contact on $R_{14}$ is also connected to $U_6$, which is a low-noise op-amp used as a buffer 67. The output from the buffer is connected to $R_8$, which is another 10-turn precision wire-wound multi-turn potentiometer 65. The sliding contact on $R_8$ is adjusted in order to zero the two outputs when the low-frequency output from the bias-T is shorted. The mechanism for zeroing may be understood in that the sliding contact on $R_8$ is connected to an INA105 precision unity gain differential amplifier. The outputs from the transimpedance amplifier and the INA105 are connected to the inputs of an INA106 precision×10 gain differential amplifier. Thus, the output of said INA106 is equal the output of the transimpedance amplifier offset by a voltage that is chosen by adjusting the sliding contact on $R_8$ for zeroing. Said output is fed to a HA-5002 high output current buffer to obtain an output which may be used to drive a 50Ω instrument to measure and/or record the tunneling current.

At a point just before the HA-5002, the signal proportional to the tunneling current, and corrected by zeroing, is also connected to the input of a second INA105 precision unity gain differential amplifier. The output of the INA105 is connected to the "current source" consisting of $U_8$, which is a low-noise op-amp used as a buffer, and $R_{23}$. Then the current $I_2$ from said current source, and the reference current $I_1$ from a REF02 precision voltage source followed by a 100K Ω resistor R29, are connected to LOG 104, a precision logarithmic and log ratio amplifier to obtain an output that is proportional to the logarithm of the ratio of $I_2$ to $I_1$. Thus, the low-frequency output from the bias-T is processed to generate two outputs, one that is proportional to the tunneling current and buffered for use with measurement devices that may have an input impedance of 50Ω, and the other being proportional to the logarithm of the tunneling current which is convenient for feedback control of the tunneling current.

Preferred Mechanical Implementations of the Present Innovation

1. Implementations in which the Sample is Only Moved Axially.

In this case there is no lateral scanning, but rather only the sample moves so that the tip-sample distance may be changed to control the tunneling current. A preferred test fixture for use in this situation is shown in U.S. Design Pat. D695,801, which is incorporated herein by reference in its entirety. A V-clamp at the top of the test fixture holds a section of semi-rigid miniature 50-Ω coaxial cable which is attached to the tip and sample at the lower end and to the sources and/or measurement apparatus at the top, as described earlier in this document. The circular ferrous disk just below the V-clamp is a disposable sample holder, to which a sample is held in place by silver paint. The sample holder is held by a permanent magnet which is insulated from the sample holder by a thin sheet of mica. The magnet is attached to an L-shaped bracket fastened to a vertical block which is piezo actuated for fine vertical positioning. The two thumbwheels (not shown, on the reverse of the depicted fixture) are used for initial vertical positioning of the tip.

2. Implementation in which the Sample is Moved Axially and Laterally.

In this case the tip is stationary as the sample moves axially to change the tip-sample distance to control the tunneling current, and laterally to scan so that different parts of the sample are below the tip (FIG. 7). This implementation is preferred in laser-assisted scanning tunneling microscopy because when the laser is focused on the stationary tip it remains focused on the tip-sample junction during scanning. As in the previous scenario, the texts fixture shown in U.S. Design Pat. D695801 is preferred. The V-clamp at the top of the test fixture holds a section of semi-rigid miniature 50-Ω coaxial cable 80 which is attached to the tip 76 and sample 74 at the lower end and to the sources and/or measurement apparatus at the top, through bias-T 70 as described earlier in this document. The circular ferrous disk just below the V-clamp is a disposable sample holder 82, to which a sample 74 is held in place by silver paint. The sample holder is held by a permanent magnet which is insulated from the sample holder by a thin sheet of mica. The magnet is attached to the piezo tube which is used for fine vertical positioning.

In a general sense, the tunneling junction and sample may act as a lumped circuit element at the end of a transmission line. To do so it is necessary for the total length of the circuit consisting of the tip electrode, tunneling junction, intervening length of the sample electrode, and connecting wire, which is connected to the end of the transmission line be less than one-quarter of a wavelength at the highest frequency to be coupled with said transmission line. Thus, because of quasi-static conditions, this circuit may be treated as a lumped element. For example, in measurements of a microwave signal at 15 GHz for optimal precision this length should not exceed 5 mm. Alternatively, the transmission line length may be as great as one wavelength if a mathematical circuit model is used to allow for the effects of the size on this circuit.

3. Implementations in which the Tip is Moved Axially and Laterally.

In many scanning tunneling microscopes the sample is stationary and the tip is moved axially to change the tip-sample distance in order to control the tunneling current, and laterally so that the tip scans over different parts of the sample. This implementation is frequently used because the tip has considerably less mass than the sample so it is possible to scan at higher frequencies.

Figure 8:
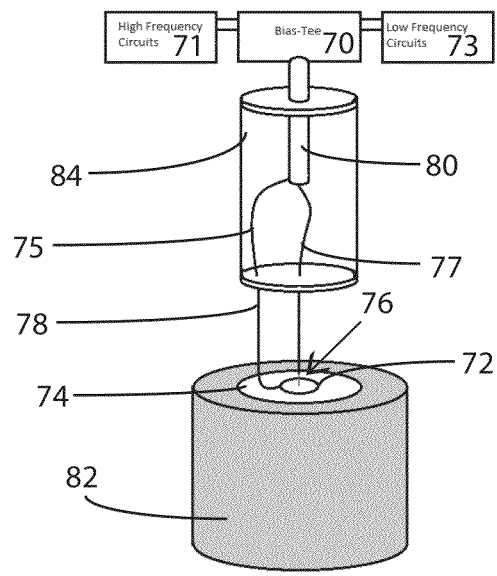
FIG. 8 is a perspective view of a scanning probe microscope setup, including the sample holder and bias-T, for use in conventional scanning probe microscope where the tip is moved for scanning instead of the sample.
Figure 9:
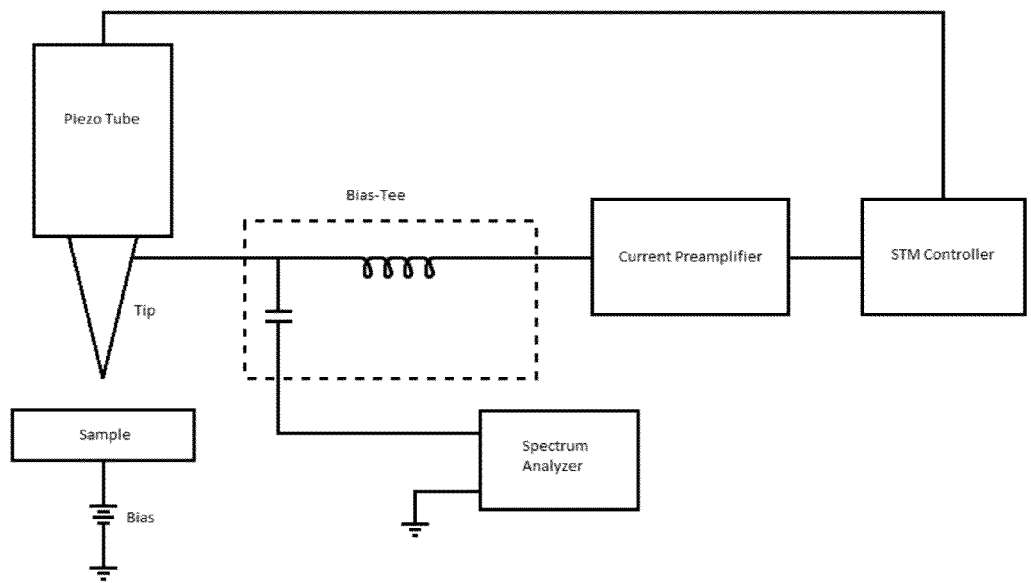
FIGS. 9 through 14 are prior art scanning probe microscopy setups described earlier in the Specification.
Figure 10:
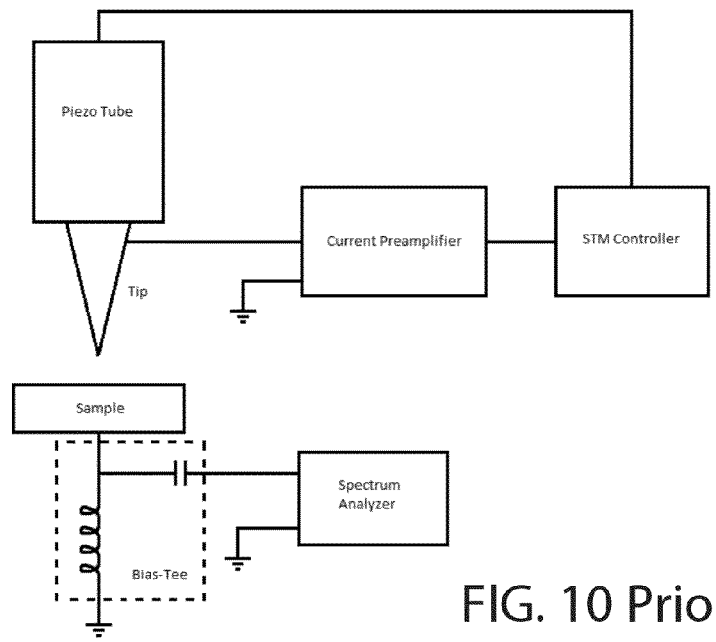
Figure 11:
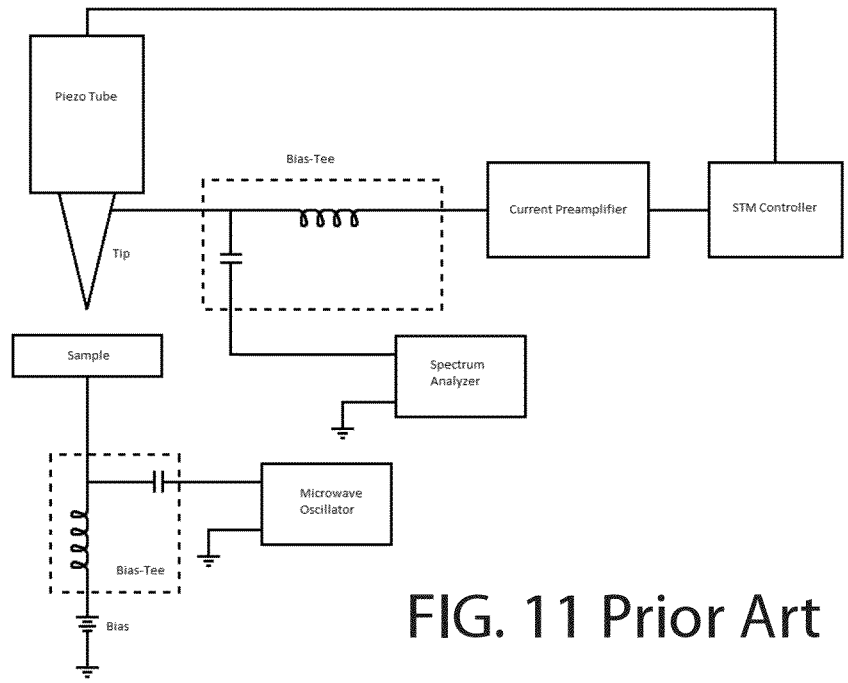
Figure 12:
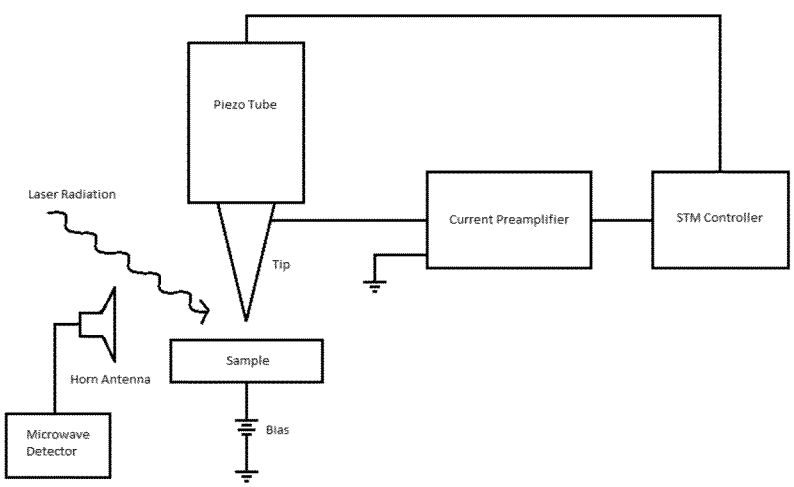
Figure 13:
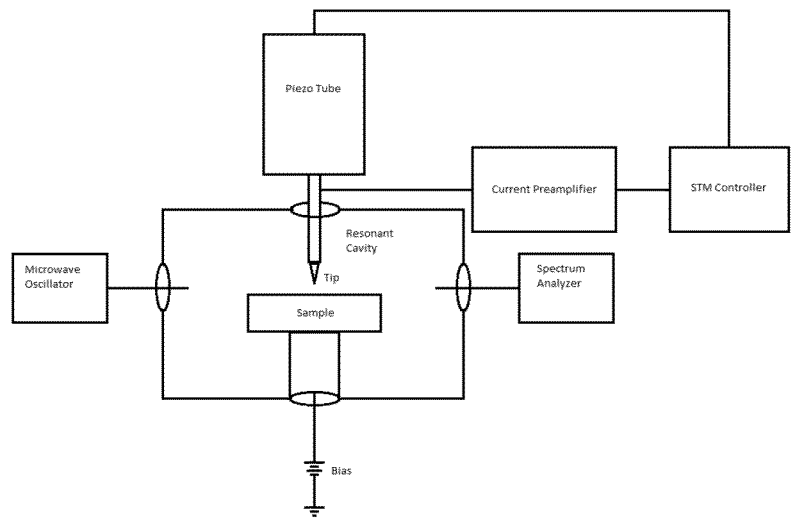
Figure 14:
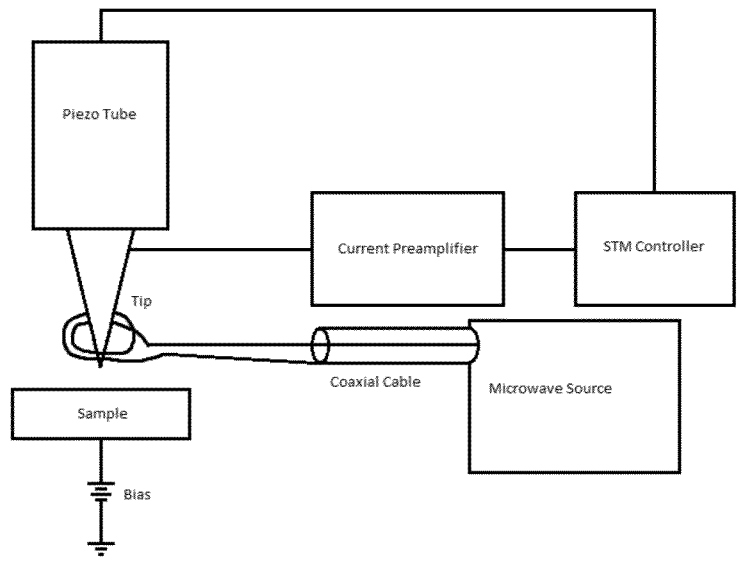

FIG. 8 shows one way in which the present innovation may be implemented with such a system, by having the section of miniature semi-rigid coaxial cable 80 pass axially through the piezo tube 84. It is essential that the top end of the piezo tube 84 be rigidly fixed in place for proper control of the motion of the tip in the STM, so the cable 80 will also be rigidly attached at only that point so that it will cause no interference with the movement of the piezo tube 84. The outer conductor and dielectric of the cable 80 are removed at a point near the base of the piezo tube 84, and a short length of flexible wire 77 is attached to the center conductor to connect to a tip holder clamp in an insulating plate at the base of the piezo tube. A second flexible wire 75 connects to a second miniature clamp in the insulating plate, and both wires have sufficient slack so that they will not interfere with the movement of the piezo tube 84. Just below the piezo tube, the tip 76 is attached to the tip holder clamp and a fine wire 78 is attached to the second clamp to complete the electrical connection of the outer conductor of the cable to a circular wire or ring attached to the sample. The opposite (top) end of the semi-rigid coaxial cable is attached to the bias-T 70, perhaps through an extension of the cable having a larger diameter for lower loss. Again, all of the electrical connections to the DC 73 and/or high-frequency 71 sources and/or measurement apparatus are made at end of the transmission line which is distant from the tip-sample junction. In FIG. 8, the metallic part of the sample holder is grey in color, and the connections with the sample are shown to be at the upper surface of the sample, which surface is shown as white in FIG. 8. This type of connection to the sample is required in order to minimize the volume of the semiconductor that is contained in the tip-sample circuit, thus reducing the pickup of noise and increase the usable bandwidth for the measurements, as previously stated in this document.

The preferred setup is shown in FIG. 7, where the sample is moved rather than the tip electrode. The setup shown in FIG. 8 allows for the movement the tip to accomplish a rapid scan of a sample. However, in situations where it is preferred to not move the tip, such as when a laser is focused thereon for SFCM, the sample is moved and the tip must be kept in a rigid and locked position. This is allowed in FIG. 7.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A method of coupling at least one electrical apparatus to a nanoscale junction by means of a transmission line with at least two electrical conductors, the junction comprising an electrically conductive tip electrode and a sample, the method comprising:
   a. coupling a bias-T to one end of the transmission line and coupling at least one apparatus to the bias-T;
   b. coupling another end of the transmission line to the nanoscale junction, such that the tip electrode is coupled to one of the at least two conductors of the transmission line; and
   c. connecting the sample to another of the at least two conductors of the transmission line;
   wherein, no other apparatus is connected to the nanoscale junction except through the bias-T.

2. The method of claim 1, the connection to the sample being accomplished by using a wire ring in contact with the sample and connecting thereby to the transmission line, the wire ring being positioned onto a surface of the sample, about an area of the sample in close proximity to the tip electrode such that the wire ring circumscribes the tip electrode.

3. The method of claim 2, wherein the sample is a semiconductor and is biased to cause a depletion region and the wire ring has a large enough circumference to be outside of the depletion region.

4. The method of claim 2, the sample being a semiconductor.

5. The method of claim 4, where the work function of the ring is as close as possible to that of the semiconductor sample to provide an ohmic contact.

6. The method of claim 1, where the tip is stationary and the sample may be moved in at least one dimension.

7. The method of claim 1, where the sample is stationary and the tip may be moved in at least one dimension.

8. The method of claim 1, the at least one apparatus being selected from the set of apparatuses consisting of: instruments for measuring voltage, instruments for measuring current, instruments for measuring frequency, instruments for measuring power, and instruments for measuring impedance.

9. The method of claim 1, further comprising a step of applying a current to the junction, the current having a frequency between 0 Hz and 15 GHz.

10. The method of claim 1, wherein the nanoscale junction is a tunneling junction in which electrons may tunnel between the electrode tip and the sample depending on the value of an applied bias.

11. The method of claim 1, the transmission line being a coaxial transmission line with a center conductor and an outer conductor.

12. The method of claim 11, the electrode tip being formed from the center conductor of the transmission line.

13. The method of claim 11, the electrode tip being supported by a piezoelectric actuator but insulated therefrom.

14. The method of claim 11, the sample being supported by a piezoelectric actuator but insulated therefrom.

15. The method of claim 1, the total length of a circuit formed from the at least two conductors of the transmission line, the wire ring and the sample is less than one wavelength of a frequency coupled to the transmission line, forming a lumped circuit element.

16. The method of claim 15, the length of the circuit forming the lumped circuit element being less than ¼ of one wavelength of the coupled frequency.

\* \* \* \* \*